July 14, 1936.    P. S. BRAUN    2,047,667
SPRING CONSTRUCTION
Filed March 19, 1934
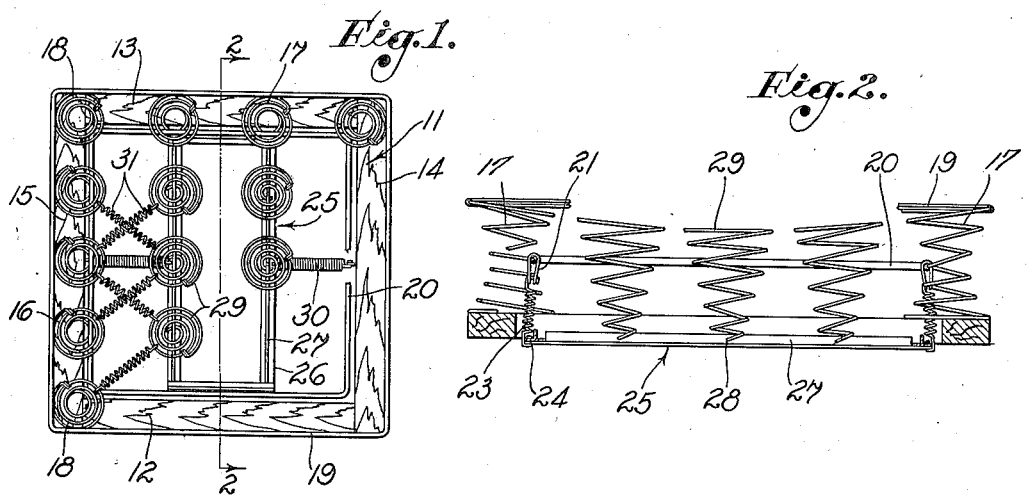
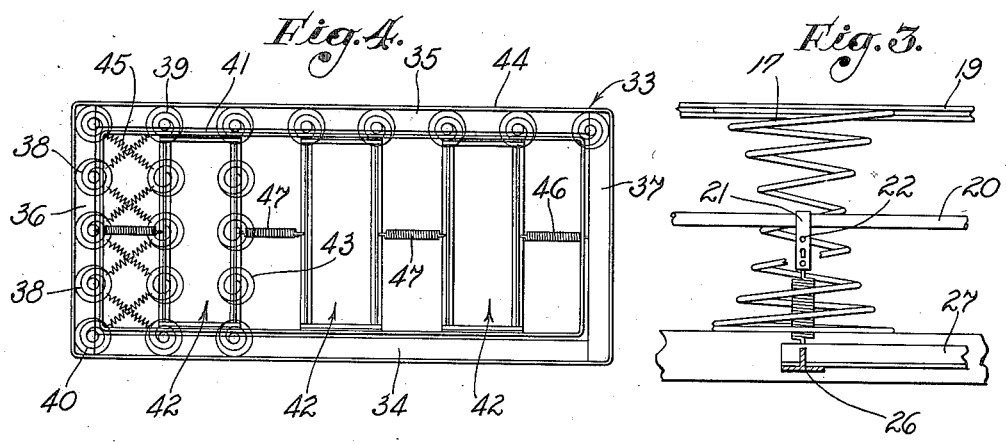
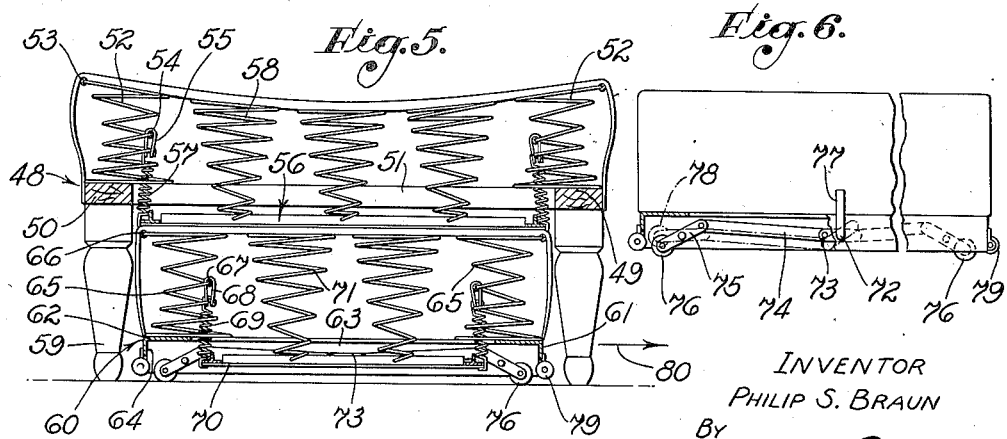
INVENTOR
PHILIP S. BRAUN
By
Fred W Lamie
ATTORNEY.

Patented July 14, 1936

2,047,667

UNITED STATES PATENT OFFICE 2,047,667

SPRING CONSTRUCTION

Philip S. Braun, Los Angeles, Calif.

Application March 19, 1934, Serial No. 716,322

2 Claims. (Cl. 155—179)

My invention relates to a spring construction, and more particularly to a spring construction for supporting one or more human beings in sitting or reclining position.

In constructions now employed for this purpose, such as upholstered chairs, vehicle seats, and the like, the resilience and consequent comfort afforded are limited by the permissible contraction of that length of coil spring which can be employed within the dimensions required. When coil springs of short length are employed in seats, such as vehicle seats, they are made of relatively little resilience and, due to this lack of resilience, cause great discomfort to the occupant and even cause physical ailments to individuals who occupy such seats for long periods of time. Even with such springs having a relatively small contraction, it is not uncommon for the springs to become crystallized and break, and damage the clothing and injure the person of the occupant of the seat.

It is an object of my invention to provide a construction of the class described of small dimensions and affording a high degree of resilience with a short flexure of the coil springs employed so that the danger of breakage of the coil springs and consequent damage and injury is minimized while maximum comfort is afforded to the occupant.

In most spring constructions employed in chairs, automobile seats, sofas, daybeds, and the like, a stationary frame supports a row of coil springs at the front, back and two sides or end of the construction, and a rigid edge wire connects the outer sides of these springs at their upper ends. The frame also provides a stationary support for other coil springs between the front and back and between the ends or sides of the construction. Little or no deformation is caused in those coil springs immediately above the frame of the seat when weight is imposed only upon those coil springs between the front and back and between the sides or ends of the seat. The result of the contraction of the central springs and the absence of contraction of the edge springs causes the deformation of the upholstering material and the padding between the upholstering material and the spring construction on the surface of the seat. Such deformation is highly destructive both to the efficiency of the padding and the life of the covering.

It is an object of my invention to provide a spring construction adapted for use in chairs, automobile seats and the like, in which a contraction of the coil springs over the edges of the frame of the seat is caused by the imposing of a weight upon the coil springs intermediate the sides and ends of the frame so that the destructive deformation of the padding and covering of the seat is to a large extent eliminated.

In the spring construction now employed for chairs, sofas, vehicle seats, and the like, the springs positioned upon the front frame member are of lesser length and consequent lesser resilience than springs employed between the front and rear frame members, so that some discomfort is caused to the occupant.

It is an object of my invention to improve upon the comfort afforded by such constructions by transferring some of the stress imposed upon the springs intermediate the front and rear frame members to the springs supported upon these frame members.

It is still another object of my invention to increase the effective length of the spring elements providing resilience and comfort to the occupant without materially increasing the depth of the space occupied by the spring construction.

It is another object of my invention to provide a construction in which springs are supported upon a frame member and in which the deformation of those springs directly over the front frame member is the function of a weight supported on the springs not directly over the frame member. My invention contemplates the performance of this object by resiliently suspending those springs not directly over the front frame member from some of those springs supported upon the frame member.

It is still another object of my invention to provide a spring construction capable of use in chairs, vehicle seats, sofas, beds, and the like, affording a ready means of adjustment to vary the degree of resilience available to best accommodate various weights, and to overcome any permanent spring deformation resulting from use.

These and other objects and advantages of my invention will be pointed out in the following description of my invention, which may be better understood with reference to the accompanying drawing in which, Fig. 1 is a plan view of that embodiment of my invention adapted for use in chairs, vehicle seats, and the like with some of the springs removed to better illustrate the construction;

Fig. 2 is a sectional view taken as indicated in Fig. 1, illustrating the deformation resulting from the imposition of a weight;

Fig. 3 is an enlarged view of the connection between the auxiliary frame and the main frame of the spring construction of my invention;

Fig. 4 is a plan view of that embodiment of my invention adapted for use in a bed, sofa, bunk, daybed, or the like, with some of the coil springs removed for illustrative purposes;

Fig. 5 is an end elevational view of an embodiment adapted for use in a sofa, daybed, studio couch, or the like, showing the deformation caused by a weight superimposed thereon; and Fig. 6 is an enlarged fragmentary view of the elevating means of the construction of my invention.

Referring to the drawing, which is for illustrative purposes only, the numeral 11 indicates a frame comprising a front member 12, a rear member 13, and side members 14 and 15. The members 12 to 15, inclusive, are rigidly secured together so that they are incapable of relative movement and are formed of wood or any other suitable material. The frame 11 is adapted to be supported at a suitable distance from the floor by legs or the like, not shown.

Secured in any suitable manner to the upper surface of each of the side members 14 and 15, and extending upwardly therefrom, is a plurality of compression members in the form of coil springs or compressible springs 16, illustrated in Fig. 1 as three in number. Similar compression springs 17 are secured to the front and rear members 12 and 13, Fig. 1 illustrating two such springs secured to each member. Corner compression springs 18 are likewise secured to the frame 11 at each intersection of the side and end members. The springs 16, 17 and 18 are preferably coil springs and may be of the hour-glass type having a lesser diameter at the middle than at either end. An outside edge wire 19 is secured to the outer side of all of the springs 16, 17 and 18 so that the tops of these springs are connected. As is well illustrated in Fig. 3, the edge wire 19 is preferably in the form of a channel with inwardly extending lips between which the upper end of the spring may be secured. The edge wire 19 is formed of such material that it is relatively rigid.

A connecting means or member in the form of an inner edge wire 20 of similar construction is secured in a similar manner to the inner side of each of the springs 16, 17 and 18 above their lower ends. Preferably, the inner edge wire 20 is secured to each of the springs substantially midway between its ends.

Suspended from each connection of the inner edge wire 20 with one of the springs 17 is a U-shaped connection or clip 21. In each of the downwardly extending legs of the clip 21 is a plurality of holes 22, shown in Fig. 3 as three in number. Each pair of holes 22 is adapted for the reception of the upper end of a connection which is preferably a resilient member such as a tension spring 23, the lower end of which is secured to ends 24 of an auxiliary supporting means or member or frame 25. The auxiliary frame 25 includes sides 26 having upwardly extending flanges 27 provided with openings 28, each of which is adapted for the reception of the lower end of a spring member or coil spring 29. As is illustrated in Fig. 1, six of the coil springs 29 are employed, three being attached to the flange 27 on one of the sides 26, and three being attached to the flange 27 on the other of the sides 26. The coil springs 29 are of a greater length than the springs 16, 17 and 18, so that the upper ends of the springs 29 are substantially in the horizontal plane of the upper ends of the springs 16, 17 and 18 when the springs are in normal position with no weight superimposed thereon. Each of the sides 26 of the auxiliary frame 25 is secured to one of the side members 14 or 15 of the frame 11 by a tension spring 30, the inner end of which is received in an opening in one of the flanges 27 similar to the opening 28. The springs 30 serve to resiliently maintain the auxiliary frame 25 centrally between the side members 14 and 15 of the frame 11. If desired, additional coil springs similar to the coil springs 30 may be provided to connect the ends 24 of the auxiliary frame 25 to the front and rear members 12 and 13 of the frame 11. However, in the embodiment illustrated in Fig. 1, such connections to the ends of the frame 11 are not necessary.

The upper ends of the springs 16, 17, 18 and 29 are connected together to maintain them in their proper position relative to each other. I prefer to make these connections resilient connections, and employ for this purpose tension springs 31. Each of the springs 16, 17 and 18 is connected to one of the springs 29 by a tension spring 31 so that the tension spring 31 connecting two adjacent springs 16, 17 or 18 to the springs 29 cross each other, as illustrated in Fig. 1. The interengagement of the springs 31 with each other at their intersection serves to more effectively maintain the coil springs in their proper alignment. The springs 29 may be secured to each other in a similar manner by tension springs, not shown, and if desired, the springs 16 may be secured together and to the adjacent springs 18, and the springs 17 may be secured together and to the adjacent springs 18 by similar tension springs.

When the embodiment of my invention illustrated in Figs. 1 to 3, inclusive, is incorporated in a chair, vehicle seat, or the like, the frame 11 is supported at a suitable distance from the floor so that space is left between the frame 11 and the floor for vertical movement of the auxiliary frame 25. A suitable pad is placed upon the top of the coil springs 16, 17, 18 and 29 and around the outer edge wire 19 to insure comfort to the occupant. This padding is covered by any suitable upholstering material, the padding and upholstering material being removed from the construction shown in the drawing to better illustrate the spring construction. If now an occupant places his weight upon the chair or seat, the greater portion of his weight is imposed upon the springs 29, causing them to contract, as illustrated in Fig. 2. The contraction of the springs 29 in response to this weight tends to move the auxiliary frame 25 downwardly. The downward movement of the auxiliary frame 25 is resiliently resisted by the tension springs 23 and by the lower half of the springs 17 to which they are connected. The resilience secured by this construction is therefore equal to that afforded by springs each of which has the length of one of the springs 29 plus the effective length of the tension spring 23 and the lower half of one of the springs 17, which is a total spring length far greater than the vertical distance between the top of the springs 29 and the bottom of the auxiliary frame 25. Moreover, even though all of the weight be imposed upon the top of the springs 29 and none of the weight be directly imposed upon the springs 16, 17 or 18, the downward movement of the auxiliary frame 25 in response to the weight placed upon the springs 29 causes a downward movement of the inner edge wire 20 to which the auxiliary frame 25 is connected and a consequent contraction of all of the springs 16, 17 and 18 with which the inner edge wire is connected. Consequently, even though all of the weight placed upon the spring construction is imposed upon the springs 29, (as distinguished from placing the weight upon the tops of the springs 16, 17 and 18 as well as the tops of the springs 29) the spring construction transfers this weight to the springs 16, 17 and 18, so that some deformation occurs in all of these springs, and the upper ends of the springs 16, 17 and 18 and the padding thereon move downwardly in response to this weight. The springs of my construction being thus connected in series, it is possible, by employing springs of the proper relative resiliency, to secure less deformation of the padding covering the tops of the springs 29 relative to the padding covering the tops of the springs 16, 17 and 18 in response to an occupant resting his weight upon the tops of the springs 29 and not directly upon the tops of the springs 16, 17 and 18 than would be the case if such occupant so rested his weight upon the old spring construction (with the springs not so connected in series) having springs providing the same comfort (i. e., total spring deformation) to that occupant.

Inasmuch as the resilience described is provided by the springs 29, the tension springs 23 and the lower half of the springs 16, 17 and 18, it is obvious that there is a lesser degree of contraction in the springs 29 than in that spring construction employed heretofore and capable of affording the same degree of comfort (i. e., total spring deformation), by the resilience provided only by the springs 29. This lesser contraction of the springs 29 to secure the same total spring deformation as the prior constructions in response to a given weight, enables the springs 29 to be made heavier and stronger than the springs in such prior constructions, and diminishes the probability of crystallization and breakage with consequent damage to the clothing of the occupant and injury to his person, and materially increases the life of the springs 29.

In Fig. 4 there is illustrated that embodiment of my invention adapted for use in a couch, sofa, bed, bunk, or the like. In this embodiment the numeral 33 indicates a frame, comprising front and rear members 34 and 35 and end members 36 and 37, which is supported at a suitable distance from the floor. Secured in any suitable manner to the end members 36 and 37 are coil springs 38, illustrated as three in number, which may be of the hour-glass type. Secured to the front and rear members 34 and 35 are coil springs 39, illustrated as six in number, and coil springs 40 of the same type are secured at each intersection of the end or side and front members of the frame 33. Connected to opposite pairs of springs 39 and to an inner edge wire 41 connecting all of the springs 38, 39 and 40 in the manner previously described, are auxiliary frames 42. There may be any desired number of the frames, the embodiment illustrated in Fig. 4 employing three such auxiliary frames. Secured to each of the auxiliary frames 42 in the manner previously described is a plurality of coil springs 43, preferably of the helical type and of a length such that the upper ends of the springs 43, 38, 39 and 40 all lie in substantially the same horizontal plane when no weight is imposed upon the springs. The upper ends of the springs 38, 39 and 40 are connected by an outer edge wire 44 similar to the outer edge wire 19 previously described, and the upper ends of the springs 38, 39, 40 and 43 are connected by engaging tension springs 45 like the tension springs 31 hereinbefore referred to.

Each of those auxiliary frames 42 adjacent the ends 36 and 37 of the frame 33 is secured to the adjacent end 36 or 37 by a tension spring 46 and the central auxiliary frame 42 is secured to the auxiliary frame on each side thereof by similar tension springs 47 so that the auxiliary frames 42 are resiliently maintained in their proper position relative to each other. This embodiment of my invention is also adapted to be covered with a padding material which extends over the tops of the springs 38, 39, 40 and 43 and over the outer edge wire 44, and with a covering of upholstering material outside the padding. This embodiment affords the advantages described in connection with the construction illustrated in Figs. 1 and 2. In addition, it should be noted that if the greater part of the weight imposed upon this construction be concentrated upon the springs 43 over one of the auxiliary frames 42, for example, the central auxiliary frame 42, part of this weight is transferred not only to the springs 39 to which this auxiliary frame is directly connected by its tension springs, but also to all of the springs 38, 39 and 40 through the connection of the central auxiliary frame 42 with all of these springs through the inner edge wire 41. As a result of this cooperation between the various spring elements, the majority of the springs in the entire construction operate to provide resilience for a weight disposed over any one or more of the springs 43. Moreover, it should be noted that the upper ends of the springs 43 supported upon one of the auxiliary frames 42 may be moved downwardly a very considerable distance in response to a weight supported thereon without a very great movement of the upper ends of the springs 43 supported upon the other auxiliary frames 42 if no weight is supported on said other springs 43. The movement of the upper ends of the springs 43 supported upon such other auxiliary frames 42 under such circumstances is substantially uniform for each of the auxiliary frames 42, so that the tendency for the development of a permanent sag of some of the springs 43 relative to other of the springs 43 supported upon the same auxiliary frame 42 is minimized. If, moreover, due to greater use, there is a tendency for one section of the construction to sag relative to another section, this sag may be readily eliminated by adjustment of the tension springs 23 relative to the connecting clips 21, so that the appearance and comfort of the construction may be readily maintained.

That embodiment of my invention illustrated in Fig. 5 is adapted for use as a sofa, daybed, or the like, its upper part being similar to the embodiment illustrated in Fig. 4. The numeral 48 indicates a frame having a front member 49, a rear member 50, and end members 51. Coil springs 52 of the hour-glass type are supported upon the frame 48 and connected at their upper ends by an outer edge wire 53. An inner edge wire 54 is connected to the inner sides of springs 52 in the manner previously described, and connecting clips 55 are attached thereto for supporting auxiliary frames 56 to tension springs 57. Coil springs 58 of the helical type are secured to and supported by the auxiliary frames 56 in the manner previously described, the entire construction being supported at a suitable distance from the floor by legs 59 secured to the frame 48.

This embodiment includes a second frame 60 which comprises a front member 61, a rear member 62, end members 63, and supporting legs or flanges 64. Coil springs 65 of the hour-glass type are supported upon the frame 60 with their upper ends connected by an outer edge wire 66 and their inner sides connected by an inner edge wire 67, as previously set forth. Clip connections 68 are suspended from the inner edge wire 67 and secured to tension springs 69 which support a second auxiliary frame 70. Secured to the second auxiliary frame 70 are coil springs 71 which are secured together and to the springs 65 in a manner similar to that already set forth. The invention contemplates the use of a plurality of auxiliary frames 56 and second auxiliary frames 70, and I have found that three auxiliary frames in the upper construction and three auxiliary frames in the lower construction accomplish very desirable results.

Pivoted at 72 to the under side of the frame 60 is a toggle member 73 to each end of which is connected a link 74. The outer end of each link 74 is pivoted to a leg 75 which is swingably secured intermediate its ends to the frame 60. A frictional element 76 of rubber or the like is mounted at the end of each of the legs 75 so that when the toggle member 73 is rotated about its pin 72 by the manipulation of a lever 77 provided at the end of the frame 60, the elements 76 may be moved between their elevated position, indicated by the dotted lines 78 at the left of Fig. 6, and their lower position indicated by the full lines in the same portion of Fig. 6.

When the legs 75 are moved to the position indicated by the dotted lines 78, the second frame 60 with all of the springs associated therewith may be moved from below the frame 48 on rollers 79 in the direction indicated by the arrow 80 of Fig. 5 to provide a second bed. Likewise, with the legs 75 in the position indicated by the dotted lines 78 of Fig. 6, the second frame 60 may be moved on the rollers 79 from its position beside the frame 48 to its position underneath the frame 50, as illustrated in Fig. 5. If then the handle 77 be manipulated to move the legs 75 into the position indicated in full lines at the left of Fig. 6, the second frame 60 will be elevated until the padding and upholstering material covering the top of the springs 71 associated with this second frame are moved into contact with the bottom of the auxiliary frame 56 associated with the frame 50. With the legs moved into this position, the rollers 79 are moved out of engagement with the frame and the frictional elements 76 resist any horizontal movement of the frame 60 relative to the frame 48. If a weight be superimposed upon the springs 52 or 58 with the construction assembled in this position, the contraction of the springs 58 and downward movement of the auxiliary frame 56 is resiliently resisted by the springs 69, the tension springs 69 and the springs 65 so that substantially twice the resistance to deformation is afforded that would be afforded if the spring construction associated with the center frame 48 were employed alone. As a result, the construction assembled as illustrated in Fig. 5 will resist very severe usage as a daybed, sofa, or the like, and provide two extremely comfortable beds when the lower frame is removed from below the frame 48.

The toggle mechanism described may be of such form as to elevate the frame 60 to the same horizontal plane as the frame 48 when the frame 60 is moved beside the frame 48 if it is desired. In this manner a double bed may be provided. Likewise, only one of the auxiliary frames 56 and 70 can be embodied in this construction to provide an extremely comfortable chair and ottoman construction.

While those embodiments of my invention hereinbefore illustrated and described are fully capable of performing those objects and providing those advantages primarily stated, there are various other embodiments of my invention likewise capable of performing these objects and providing these advantages, and I therefore wish my invention to be understood as not restricted to the construction hereinbefore specifically set forth.

I claim as my invention:

1. In a device of the class described, the combination of: a frame comprising front, back, and end members; coil springs supported on said front, back and end members; an edge wire connecting the inner sides of all of said springs above their lower ends; a movable supporting member below said edge wire; connecting means secured to said supporting member and said edge wire, said connecting means being adjustable to vary the position of said supporting member relative to said frame; other coil springs supported upon said supporting member so that their upper ends are substantially in the plane of the upper ends of said coil springs on said frame; and tie means connecting said other coil springs together and to said coil springs on said frame to maintain all of said springs in desired position relative to each other.

2. In a device of the class described, the combination of: a frame comprising front, back and end members; coil springs supported on said front, back and end members; an edge wire connecting the inner sides of all of said springs above their lower ends; a movable supporting member below said edge wire; tension springs connected to said supporting member; clip means attached to the connection of said edge wire and one of said coil springs, said clip having a plurality of openings each of which is adapted for the reception of the end of one of said tension springs; other coil springs supported upon said supporting member so that their upper ends are substantially in the plane of the upper ends of said coil springs on said frame; an outer edge wire connecting the outer side of all of said coil springs supported on said frame at their top ends; and tie means connecting said other coil springs together and to said coil springs on said frame to maintain all of said springs in desired position relative to each other.

PHILIP S. BRAUN.